(12) United States Patent
Leamon

(10) Patent No.: US 6,970,829 B1
(45) Date of Patent: Nov. 29, 2005

(54) METHOD AND SYSTEM FOR SKILLS-BASED PLANNING AND SCHEDULING IN A WORKFORCE CONTACT CENTER ENVIRONMENT

(75) Inventor: Paul H. Leamon, McKinney, TX (US)

(73) Assignee: IEX Corporation, Richardson, TX (US)

( * ) Notice: Subject to any disclaimer, the term of this patent is extended or adjusted under 35 U.S.C. 154(b) by 0 days.

(21) Appl. No.: 09/504,330

(22) Filed: Feb. 14, 2000

(51) Int. Cl.[7] ............................................. G06F 17/60
(52) U.S. Cl. ...................... 705/9; 705/7; 705/8; 705/10; 705/14; 370/270; 379/265.02; 379/265.05; 379/266.01; 379/266.09; 709/238
(58) Field of Search ................ 705/26, 8–10, 705/7, 14; 379/265.05, 265.02, 266.01, 266.09; 370/270; 709/238; G06F 17/60

(56) References Cited

U.S. PATENT DOCUMENTS

| | | | | |
|---|---|---|---|---|
| 5,325,292 A | * | 6/1994 | Crockett ........................ | 705/9 |
| 5,519,773 A | * | 5/1996 | Dumas et al. .......... | 379/265.05 |
| 5,742,675 A | * | 4/1998 | Kilander et al. ........ | 379/266.09 |
| 5,815,566 A | * | 9/1998 | Ramot et al. .......... | 379/210.01 |
| 5,937,057 A | * | 8/1999 | Bell et al. .............. | 379/265.02 |
| 6,012,152 A | * | 1/2000 | Douik et al. .................... | 714/26 |
| 6,049,779 A | * | 4/2000 | Berkson ....................... | 705/14 |
| 6,088,678 A | * | 7/2000 | Shannon ........................ | 705/8 |
| 6,122,364 A | * | 9/2000 | Petrunka et al. ........ | 379/265.02 |
| 6,198,739 B1 | * | 3/2001 | Neyman et al. ............. | 370/353 |
| 6,205,412 B1 | * | 3/2001 | Barskiy et al. ................ | 703/13 |
| 6,263,065 B1 | * | 7/2001 | Durinovic-Johri et al. ....................... | 379/266.03 |
| 6,359,981 B1 | * | 3/2002 | Neyman et al. ........ | 379/265.09 |
| 6,404,747 B1 | * | 6/2002 | Berry et al. ................. | 370/270 |
| 6,449,356 B1 | * | 9/2002 | Dezonno ................ | 379/265.01 |
| 6,480,600 B1 | * | 11/2002 | Neyman et al. ........ | 379/265.09 |
| 6,512,825 B1 | * | 1/2003 | Lindholm et al. ..... | 379/266.01 |
| 6,581,105 B2 | * | 6/2003 | Miloslavsky et al. ....... | 709/238 |
| 2003/0115353 A1 | * | 6/2003 | Deryugin et al. | |

FOREIGN PATENT DOCUMENTS

| | | | | |
|---|---|---|---|---|
| CA | 2330396 A1 | * | 9/2001 | ............. G06F 9/46 |
| EP | 1143364 A1 | * | 10/2001 | ........... G06F 17/60 |
| JP | 2001312538 A | * | 11/2001 | ........... G06F 17/60 |

OTHER PUBLICATIONS

Maggie Klenke, ACDs get skills-based routing, Business communications review, pp. 48-51, Jul. 1995.*

Deryugin et al., Method & apparatus for extended management of state and interaction of a remote knowledge worker from a contact center, PGPUB-Document Jun. 19, 2003.*

Primary Examiner—Yogesh C. Garg
(74) Attorney, Agent, or Firm—David H. Judson

(57) ABSTRACT

A method of forecasting, allocating and scheduling in a single or multi-site skills-based contact or call center environment organized into a hierarchy of zero or more business units at a first, upper level, one or more contact types at a second, intermediate level, and one or more management units at a third, lower level. A user creates (a) a set of given contact allocations that define how contacts are distributed from a given business unit to multiple contact types, and (b) a set of given requirement allocations that define how agent requirements are distributed from a contact type to one or more management units. Agent availability by contact type is then predicted to generate agent availability data. Thereafter, forecasted contacts and forecasted agent requirements are allocated based on the given contact and requirement allocations as well as the agent availability data. Preferably, the agent availability data is predicted using a schedule simulator and is characterized by contact type for agents in the same skill group.

20 Claims, 5 Drawing Sheets

METHOD AND SYSTEM FOR SKILLS-BASED PLANNING AND SCHEDULING IN A WORKFORCE CONTACT CENTER ENVIRONMENT

CROSS-REFERENCE TO RELATED APPLICATION

This application is related to copending application Ser. No. 08/890,228, filed Jul. 9, 1997, titled "Skills-Based Scheduling For Telephone Call Centers." This application also contains subject matter that is protected by copyright; all rights reserved.

BACKGROUND OF THE INVENTION

1. Technical Field

The present invention relates generally to planning, scheduling and managing workforce personnel in a "contact center" environment (e.g., a telephone call center, or a contact center that handles one or more of the following contacts: telephone calls, voice mails, faxes, email, web callback requests, web chats, web voice calls, web video calls and outbound calls) in which there is a varying workload by time of day and by day of week to be staffed with agents having different "skill" profiles.

2. Description of the Related Art

A "call center" is an organization of people, telecommunications equipment and management software, with the mission of efficiently handling telephone-based customer contact. A typical call center must balance competing goals. Customers should experience high quality and consistent service as measured, for example, by how long the customer's call must wait in queue before being answered. At the same time, this service should be provided at the lowest possible cost to the call center owner.

"Workforce management" systems provide important tools for meeting the goals of the call center. These systems generate forecasts of call volumes and call handling times based on historical data to determine how much staff will be needed at different times of the day and week. The systems then create schedules that match the staffing to the anticipated needs.

Calls that arrive at a call center generally are classified into "call types" based on the dialed number and possibly other information such as calling number or caller responses to prompts from the network. The call center is typically served by an automatic call distributor (ACD), which identifies the call type of each incoming call and either delivers or queues it. Each call type may have a separate first-in-first-out queue in the ACD. In most existing call centers, the agents answering calls are organized into one or more "teams," with each team having primary responsibility of the calls in one or more queues. This paradigm is sometimes referred to as "queue/team."

In the queue/team model, scheduling for each team can be done independently. Suppose, for example, that the call center handles calls for Sales, Service, and Billing, and that each of these call types is served by a separate team. The schedule for Sales agents will depend on the forecast for Sales call volume and on various constraints and preferences applicable to the agents being scheduled, but this schedule is not affected by the call volume forecast for Service or Billing. Further, within the Sales team, agents can be considered interchangeable from a call handling viewpoint. Thus, within a team, schedule start times, break times and the like, may be traded freely among agents in the team to satisfy agent preferences without affecting scheduled call coverage.

It is known in the prior art to provide ACD systems that depart from the queue/team model described above. Calls are still categorized into call types. In place of queues for the call types, however, queues associated with "skills" are provided. The ACD's call distribution logic for the call type determines which queue or queues a call will occupy at various times before it is answered. Agents are not organized into teams with exclusive responsibility for specific queues. Instead, each agent has one or more identified "skills" corresponding to the skills-based queues. Thus, both a given call and a given agent may be connected to multiple queues at the same time. Agent skills designations may be further qualified, for example, as "primary" or "secondary" skills, or with some other designation of skill priority or degree of skill attainment. The ACD call distribution logic may take the skill priority levels into account in its call distribution logic.

In a queue/team environment, when a new call arrived, the ACD determined the call type and essentially asked "Are there any agents available in the team that serves this call type?" If the answer were yes, the team member who had been available the longest would be chosen to handle the new call. If the answer were no, the call would be queued, waiting for a team member to free up. Similarly, when an agent became available, the agent would get the longest-waiting call on any of the queues served by the agent's team.

In a skills-based routing environment, on the contrary, the "matching" of calls to agents by the ACD becomes more sophisticated and thus complicated. Agents who have more than one skill no longer "belong" to a well-defined team that handles a restricted set of calls. Instead, the skills definitions form "implicit" teams that overlap in complex ways. If, for example, a call center has 10 skills defined, then agents could in principle have any of 1024 possible combinations ($2^{10}$) of those skills. Each skill combination could be eligible to handle a different subset of the incoming calls, and the eligible subset might vary with time of day, number of calls in queue, or other factors used by the ACD in its call routing decisions.

Thus, scheduling of agents in a skills-based environment is a much more difficult problem than it is in a queue/team environment. In a skills-based environment, call types cannot be considered in isolation. Thus, for example, a heavy volume of Service calls might place higher demands on multi-skilled agents, causing an unforeseen shortage of coverage for Billing calls. Further, agents with different skills cannot be considered interchangeable for call handling. Thus, trading lunch times between a Sales-only agent and a multi-skill agent might lead to over-staffing Sales at noon while under-staffing Service at 1:00 p.m. This would lead to undesirable results. Moreover, with respect to the needs of a particular call type, a multi-skilled agent might provide no help over a given span of time, might be 100% available for calls of that type, or might be available part of the time and handling other call types for another part of time.

There remains a need in the art to provide workforce management systems for planning and managing call center environments in which agents have unique skill sets. The present invention addresses this need.

BRIEF SUMMARY OF THE INVENTION

The present invention describes a process for skills-based planning and scheduling in a workforce environment such as a telephone call center. The planning process includes creating a forecast, and then allocating calls and requirements based on that forecast. According to the invention, the planning step preferably involves a one or two-level allocation scheme. The first level allocates a percentage of incoming calls from a "business unit" (BU) to multiple call types, where each call type may be handled by one or more management units. Each management unit (MU) is a collection of agents typically located at a particular call center location (e.g., a site or floor within a multi-story site). The second level allocates agent requirements from each ACD call type to one or more MUs. Thus, agent requirements preferably are developed at an ACD level and then allocated to multiple MUs.

In an illustrative embodiment, a method of allocating and scheduling in a skills-based call center environment begins by organizing the call center environment into a hierarchy of one or more business units at a first level, one or more call types at a second level, and a set of one or more management units at a third level. A user creates (a) a set of given call allocations that define how calls are distributed from a given business unit to multiple call types, and (b) a set of given requirement allocations that define how agent requirements are distributed from a call type to one or more management units. Agent availability by call type is then predicted to generate agent availability data. Thereafter, forecasted calls and forecasted agent requirements are allocated based on the given call and requirement allocations as well as the agent availability data. Preferably, the agent availability data is predicted using a schedule simulator and is characterized by call type for agents in the same skill group.

According to the invention, a user may create a set of given minimum or maximum allocations for distributing calls from a BU to multiple call types (ACDs) and for distributing agent requirements from a call type to one or more MUs. These minimum or maximum allocations may be defined per period for a default week or may be defined per period per date. The sum of the minimum allocations for a BU or call type for any date and period may be from 0–100%, but most preferably will be about 20–40%. Allowing the user to enter minimum allocations allows the present invention to attempt to schedule a certain amount of appropriately skilled agents as desired per ACD (call type) and per MU within each ACD (call type) throughout the day. This allows the inventive mechanism to best fit the schedules across multiple call centers while at the same time preserving a minimum level of skill coverage throughout the hours of operation for each MU.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
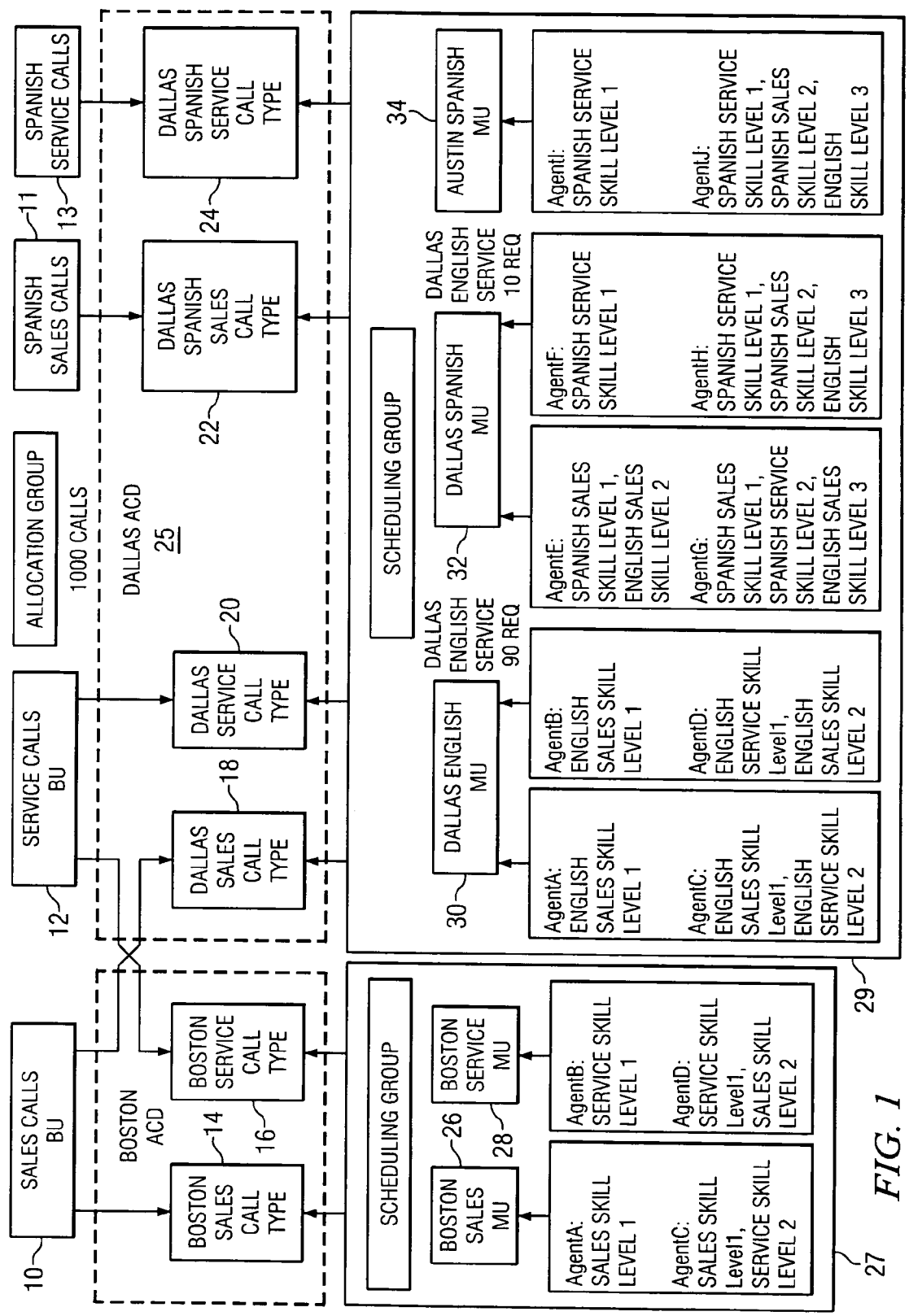
FIG. 1 is a simplified illustration of a call center workforce environment wherein a set of Business Units are used to plan the allocation of incoming calls to call types and call types are used to plan the allocation of agent requirements to Management Units according to the present invention.

The present invention is described in the context of a telephone call center. One of ordinary skill, however, will appreciate that the inventive functionality may be used in any generic "contact center" that handles one or more of the following contact types: telephone calls, voice mails, e-mails, faxes, mail, web callback requests, web chats, web voice calls, web video calls and outbound calls, and the like). In addition, the invention may be incorporated into any work environment where tasks are allocated by skill.

Familiarity with telephone call center operations is presumed. In such operations, it is desired to plan, schedule and manage workforce personnel in an environment in which there is a varying workload by time of day and by day of week to be staffed with a variable number of servers. In general, these servers or "agents" are required to respond to an event load that has been forecast to occur in the future. One such environment is a telephone call center in which, for example, an "event" is an incoming call to the center. It is known to provide so-called "workforce" management systems that generate forecasts of call volumes and call handling times based on historical data, and to determine how much staff will be needed at different times of the day and week. These known systems have the capability of creating schedules that match the staffing to the anticipated needs. A representative system is described in U.S. Pat. No. 5,325,292, which patent is assigned to the assignee of this application.

The workforce management process is an iterative one. The first step is planning, which includes the creation and adjustment of forecasts and the subsequent allocation of the forecast to each work group in a single or multi-site call center configuration. These allocations are called plans. Plans are derived from either a static allocation or dynamic allocation based on a prediction of the number of available agents at each site. The second step in the management process is scheduling. Schedules are created using the plans provided to each site and workgroup. Information about each specific agent's work rules and preference may be used to create an optimal set of schedules within constraints provided by a user. The third step in the process is change management, which includes two sub-processes that occur concurrently: change monitoring and change execution. Change monitoring is the process of viewing and responding to the effects of changes in the forecasts, plans and schedules in a near real-time mode. Change execution is the process of altering forecasts, plans and schedules. The final step in this iterative process is reporting, which monitors the success of the planning efforts, scheduling methods and change management practices.

According to the present invention as will be seen, each of a plurality of agents to be scheduled in the call center has a combination of defined "skills." One or more agents are then organized into "skill groups," each including all scheduled agents having a particular sub-combination of skills. Thus, for example, agents in skill group A have skills 1, 2 and 3, wherein agents in skill group B have skills 2, 3 and 5, for instance. Skills designations may be further qualified, for example, as "primary" or "secondary" skills, or with some other designation of skill priority or degree of skill attainment. In addition, some agent skills can be designated as "reserve" skills. In the preferred embodiment, skill priorities are included when organizing agents into skill groups; in a particular skill group, all agents have the same skills at the same priority levels and the same reserve settings. It is further assumed that calls arriving at the call center may be classified according to so-called "call types" based on a dialed number and (possibly) other information, such as the calling number or some caller response to network prompts. In the paradigm of the present invention, each agent has one or more identified skills that make the agent available to handle particular call types. A principal goal of workforce management in this environment is to create a work schedule for that agent (and other agents scheduled to work at the same time during a given scheduling interval) that maximizes the quality of service offered by the call center.

As used herein, the following terms have the following meanings. A "management unit" (MU) is a collection of agents. An MU is used to access groups of agents in various screens and reports. Several processes are run at the MU level. Typically, an MU represents a particular call center location (e.g., a site or floor within a multi-story site), although several sites can be combined into one MU. Agents in an MU may or may not handle the same type(s) of calls. A "call type" is a type of call (from one or more queues) that is handled by one or more MUs. Preferably, forecasts are created at the BU and call type levels and plans are created at the BU, call type and MU levels. Forecasts are created, preferably using historical call and AHT data that is stored at the call type level. The call type's plan requirements are allocated to each MU composed of agents that are skilled to handle the associated call type, using information about each of the MU's agents and operating hours. Call types can be served by multiple MUs. A "call type" is a queue or a collection of queues. Call types preferably have no MUs directly assigned. This allows an MU to be associated with more than one call type. A "business unit" (BU) is a collection of call types. The BU construct is useful in the environment where the organization has multiple sites that take the same type of call, each site has its own ACD, and the ACDs are either linked via a network-based call router or intelligent ACD to ACD routing is used. In this scenario, the user may establish one call type with multiple MUs (one or more for each site) or establish a BU with multiple call types (preferably, each call type could have several MUs associated therewith). In a BU, the call and AHT history preferably is stored at the call type level. Forecast and plans for calls preferably are generated at the BU level instead of the call type level, thereby creating a "national" forecast. The aggregate forecasted calls are allocated to each call type assigned to the BU, using static allocations or dynamically by using information about each call type's operating hours and agent availability. A BU can have multiple call types.

According to the present invention, two levels of allocations are implemented when BUs are utilized in a skills-based routing environment. The first level is to allocate a percentage of BU calls to multiple ACDs (call types). The second level is to allocate requirements from each ACD call type to one or more MUs. These levels are illustrated in FIG. 1, which is a representative implementation. This implementation should not be taken to limit the present invention. In this illustrative example, there are two BUs 10 and 12, multiple call types 14, 16, 18, 20, 22 and 24, and several MUs, including MUs 26 (Sales) and 28 (Service) in Boston, MUs 30 (English) and 32 (Spanish) in Dallas, and MU 34 (Spanish) in Austin. MUs 26 and 28 have agents with varying skill levels as indicated and together form a Scheduling Group 27. MUs 30, 32 and 34 have agents with varying skill levels as indicated and together form a Scheduling Group 29.

The lines between business units and call types in FIG. 1 reflect allocations, BU 10 receives Sales calls, while BU 12 receives Service calls, with each BU preferably having a different incoming (e.g., 1-800) telephone number. There is also a source 11 of Spanish Sales calls, and a source 13 of Spanish Service Calls. The Boston Sales and Service Call Types are supported by the Boston ACD 15, while the Dallas ACD 25 supports the Dallas Sales and Service, both in English and in Spanish. Incoming calls directed to English Sales are allocated to the Boston and Dallas Sales Call Types 14 and 18, while calls directed to English Service are allocated to the Boston and Dallas Service Call Types 16 and 20. This is the first level allocation. At the same time, each call type's requirements on each ACD are allocated to one or more MUs. Thus, some percentage of the call type requirements on the Boston Sales and Service Call Types are handled by each of the MUs 26 and 28, while some percentage of the call type requirements on the Dallas Sales and Service (both in English and in Spanish) are handled by the MUs 30, 32 and 34.

According to the invention, a user creates one or more Skill Allocation Groups (SAGrp), one of which is illustrated in FIG. 1. The SAGrp is used in generating a skill forecast and a skill plan. The purpose of the SAGrp is to establish the entities that will be used to allocate BU calls to call types and to allocate call type requirements to MUs. These allocations can be defined to be static, dynamic, or dynamic with minimum or maximum allocation. If BUs, call types and MUs are interrelated in any manner (e.g., by multi-site call sharing, load balancing, or overflowing and multi-queuing to multi-skilled agents), the user may create one SAGrp that includes all MUs, call types and BUs that are interrelated. Other SAGrps may be defined for BUs, call types and MUs that are not interrelated with other BUs, call types and MUs. The user may combine BUs, call types and MUs into Skill Scheduling Groups (SSGrps) to schedule all agents who will be answering a particular set of call types together. Typically, SSGrps will be the same as the SAGrps for ease of administration and central control. If each site or MU will be responsible for generating schedules, then SSGrps may be defined as subsets of the SAGrp.

The purpose of the skill plan also is to appropriately allocate requirements to the MUs based on agent availability. The requirements that are allocated to each MU will then be used for scheduling. If the user has a call type served by only one MU, 100% of the requirements are allocated to that one MU. Call types served by multiple MUs, and BUs with multiple call types, must be treated differently. For these configurations, it is required to calculate a total number of available agents for each call type by time periods in each MU. These availability numbers may then be converted to percentages, which are then used to allocate forecasted calls or requirements to the respective call types and MUs.

The process for planning (creating a forecast, allocating calls and requirements) and scheduling in a skills-based environment is now described in more detail. According to the invention, a user creates a set of minimum (and/or perhaps, maximum) allocations for distributing calls from a BU to multiple call types (sites) and for distributing agent requirements from a call type to one or more MUs. These minimum (and/or maximum) allocations may be defined per period for a default week or may be defined per period per date. In the case of minimum allocations, the sum of the allocations for a BU or call type for any date and period may be from 0–100%, but most preferably will be about 20–40%. If no minimums have been defined, dynamic call allocation may be used. Allowing the user to enter minimum allocations allows the present invention to attempt to schedule a certain amount of appropriately skilled agents as desired per ACD (call type) and per MU within each ACD (call type) throughout the day. This allows the inventive mechanism to best fit the schedules across multiple call centers while at the same time preserving a minimum level of skill coverage throughout the hours of operation for each MU.

According to the invention, the user generates a Skill Allocation Group (SAGrp) forecast. This planning process will generate the associated BU call forecast and call type AHT forecast and then allocate a percentage of the BU calls to each call type as specified in the minimum call allocations. The requirements at the call type level are calculated using each call type's respective AHT forecast. These requirements are then allocated to each MU as specified in the minimum (and/or maximum) requirement allocations.

If either the minimum call allocations or minimum requirement allocations do not add up to 100%, then the remaining allocations are determined by first generating schedules to meet the minimum allocations, and then executing a simulation that iteratively generates and adjusts additional schedules to meet requirements. This iterative process then converges on allocations based on skill group availability. A preferred technique for iteratively generating and adjusting the additional schedules to meet requirements is described in commonly-owned copending application Ser. No. 08/890,228, which is incorporated herein by reference. After the simulation process described in that application is completed, the final allocations are calculated and stored. If the user decides to store schedules, then the schedules used to create the allocations are finalized by executing preference routines in an agent tour generator and storing the resulting schedules. In addition, when the user has elected to store schedules, the skill plan is automatically released. After the skill forecast and skill plan have been generated, the user may manually adjust the call or requirement allocations using a monitor screen.

Figure 2:
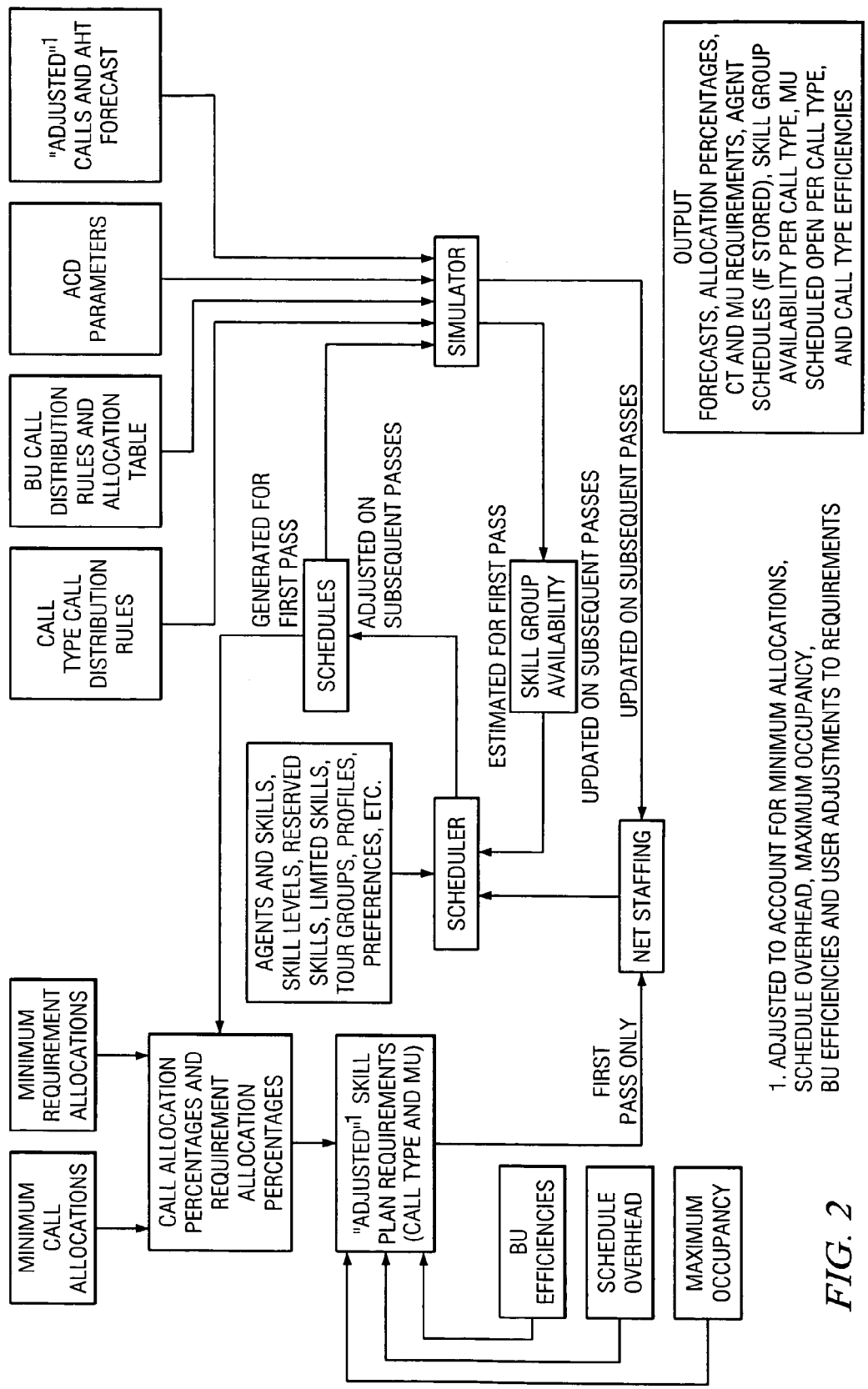
FIG. 2 is a process flow diagram illustration how a skill plan is created for a Skill Allocation Group according to the present invention.

The general process flow of how a skill plan is created for a Skill Allocation Group is illustrated in FIG. 2. This process provides several advantages. The allocations are partially static for planning and control to make sure that the call type and MU office hours are fulfilled. However, the allocations may be partially dynamic to allow for week to week variations in agent availability to be considered. Some of the inputs to this dynamic agent availability processing may include, as will be seen, tour group changes, future exceptions, agent preferences, and the like. In addition, by meeting the minimum call allocations and minimum requirement allocations first, the process prevents a redefining of call type and MU hours that might occur by covering all of a BU's calls at one call type (site) or all of a call type's requirements with a single MU.

The following is a detailed description of the preferred embodiment of the present invention.

1.0 Skill Allocation Group Forecasting

The user generates Active and Short Term forecasts for each Skill Allocation Group.

This generates the forecast information for skills-based BUs and skills-based teams (i.e. call types). This also creates the Skill Plan data for the associated Skill Allocation Group as described below in Section 1.1, "Skill Plan Generator (Skills-Based Allocations)". The user may enter the following inputs.

General Inputs
1. Skill Allocation Group ID
2. Flag for generating schedules
3. From date
4. To Date
5. Forecast name (for Short Term forecasts)

BU Inputs
The following inputs are provided for each BU in the Skill Allocation Group.
1. Service Level (input from the command line for Short Term forecasts; read from the database from the lowest ID call type that belongs to the BU for Active forecasts)
2. Occupancy Adjustment (input from the command line for Short Term forecasts; read from the database for each call type that belongs to the BU for Active forecasts)
3. Calls Growth Rate (input from the command line for Short Term forecasts and Active forecasts)
4. Call Type AHT Growth Rate (input from the command line for Short Term forecasts and Active forecasts)
5. Forecast Weightings (from the command line)
6. Percent Increase in Calls (from the command line)
7. Percent Increase in AHT (from the command line)
8. Percent of Abandoned Calls to Use (from the command line)
9. BU Special Days (read from the database)
10. Call Type Special Distributions (read from the database for use in the AHT forecast for call types that belong to the BU)
11. BU Apply Seasonality Factor (read from the database)
12. BU Apply Week of Month Factor (read from the database)

Call Type Inputs
The following inputs are provided for each Call Type in the Skill Allocation Group for Call Types that do not belong to a BU.
1. Service Level (input from the command line for Short Term forecasts; read from the database for Active forecasts)
2. Occupancy Adjustment (input from the command line for Short Term forecasts; read from the database for Active forecasts)
3. Calls Growth Rate (input from the command line for Short Term forecasts and Active forecasts)
4. AHT Growth Rate (input from the command line for Short Term forecasts and Active forecasts)
5. Forecast Weightings (from the command line)
6. Percent Increase in Calls (from the command line)
7. Percent Increase in AHT (from the command line)
8. Percent of Abandoned Calls to Use (from the command line)
9. Call Type Special Days (read from the database)
10. Call Type Special Distributions (read from the database)

11. Call Type Apply Seasonality Factor (read from the database)
12. Call Type Apply Week of Month Factor (read from the database)

The forecast generator populates the skill plan data when forecasting for a skill allocation group.

Because skill forecasting includes the schedule generator/schedule simulator as will be described below, the forecast generator calculates and stores the call type efficiencies. The forecast generator adjusts the requirements that are calculated to include the maximum occupancy defined for the call type and stores the result in a new forecast data field.

1.1 Skill Plan Generator (Skills-Based Allocations)

The inventive mechanism supports skill set scheduling for Teams with multiple MUs and for BUs. Accordingly, the mechanism must allocate calls at a network level (BU level) to individual ACDs (team level) and allocate requirements per call type (team) at each ACD to MUs. MUs may be defined to contain agents from more than one ACD even though configuring an MU across ACDs would be rare. Therefore, an allocation of BU calls to an ACD (team) could be handled by more than one MU. Because of this, two levels of allocations are implemented when BUs are utilized in a skills-based routing environment. The first level is to allocate a percentage of BU calls to multiple ACDs (Call Types/teams). The second level is to allocate requirements from each ACD Call Type (team) to one or more MUs.

The user enters a minimum amount of calls that should be allocated to each ACD and a minimum amount of requirements that should be allocated to each MU. The scheduler then creates schedules to meet the minimum allocations entered when the simulation is run while allowing the percent of allocations not included in the minimum to be decided from the schedules that are created.

After these call allocations are created and stored and the requirement allocations are created and stored, the user then generates schedules (if not done as part of the forecast and allocation process). The schedules are generated for all MUs in the skill allocation group at one time or for a subset of the skill allocation group. Schedules are created and updated by using a skill scheduling group that may be defined the same as a skill allocation group or as a subset of a skill allocation group.

Preferably, generating a forecast for a BU also generates the allocations to the ACDs because the allocations are needed to combine the calls with the ACD specific AHTs to calculate requirements. For the Skill Plan Generator, preferably the call and requirement allocations are generated for all BUs, call types and MUs in the skill allocation group at the same time when forecasting.

The process for forecasting, allocating and scheduling in a skills-based environment is as follows:

1. The user creates a set of minimum call allocations for distributing the calls from a BU to multiple Call Types. These minimum call allocations are defined per period for a default week and may additionally be defined per period per date. These minimum call allocations are assigned to the Call Types in a BU. The minimum call allocations are defined at the system level. Once assigned to a call type, the minimum call allocations are applied to requirements based on the call type's time zone. That is, the minimum call allocations defined at the 8:00 am period are applied to the 8:00 am period in the call type's time zone. The sum of the minimum call allocations for the Call Types in a BU for any date and period may be from 0–100%, but most likely will be approximately 20% to 40%. The user may choose not to define and/or assign any minimum call allocations. In this case, dynamic call allocations are used. If the user defines minimum call allocations that sum to 100% per period (for all periods with data for the week being processed) to model static allocations, then the BU Call Distribution Rules including the allocation table are not used. If the minimum call allocations do not sum to 100%, then the minimum call allocations and allocation table in the BU Call Distribution Rules could conflict; therefore, the user needs to make sure that this data does not conflict.

2. The user may create a set of minimum requirement allocations for distributing the requirements from a Call Type to one or more MUs. These minimum requirement allocations are defined per period for a default week and may additionally be defined per period per date. These minimum requirement allocations are assigned to MUs. The minimum requirement allocations are defined at the system level. Once assigned to an MU, the minimum requirement allocations are applied to call type requirements based on the MU's time zone. That is, the minimum requirement allocations defined at the 8:00 am period are applied to the 8:00 am period in the MU's time zone. The sum of the minimum requirement allocations for the MUs per call type for any date and period may be from 0–100%, but most likely will be approximately 20% to 40%. Note that the user may choose not to define and/or assign any minimum requirement allocations. In this case, Dynamic requirement allocation will be used.

3. The user may create and assign maximum occupancy goals per call type.

4. The user generates a skill allocation group forecast, which will generate the associated BU and call type forecasts and then allocate a percentage of the BU calls to each call type as specified in the minimum call allocations. The requirements at the call type are allocated to each MU as specified in the minimum requirement allocations. If the minimum call allocations add up to 100% for each period that contains non-zero BU forecasted calls, then the call allocations are set to the static call allocations defined by the user. In this case, the process will simulate random arrival of the defined percentage of the BU calls being delivered to the associated call types (without utilizing the BU Call Distribution Rules at all). If the minimum requirement allocations add up to 100% for each period of non-zero call type requirements, then the requirement allocations are set to the minimum requirement allocations. If either the call allocations or requirement allocations are not set based on the static percentages summing to 100% for each period with non-zero data, then the associated final allocations are determined by generating schedules (with the scheduler/simulator feedback algorithm described below) to meet the minimum allocations. Note that in the simulation, agents are considered logged in based on exception codes that are designated as Skill Plan Availability codes. After the stopping parameters have been met in the scheduler/simulator, then the final allocations will be stored in dbSkillPlanHead, dbSkillPlanBU, dbSkillPlanCT database tables. If both the minimum call allocations and minimum requirement allocations sum to 100% for each period with non-zero data, then those allocations are used for the Skill Plan as shown below.

5. If the user has elected to store schedules, then the schedules used to create the allocations are finalized by executing preference routines in the scheduler and storing the resulting schedules as described in the algorithm below. In addition, when the user has selected to store schedules, the Skill Plan is automatically released by this process, thereby updating the skill plan released date range.

6. If the user desires to manually change the allocations, that is allowed as well.
7. The allocations will be released and regenerated at the skill allocation group level.

Figure 3A:
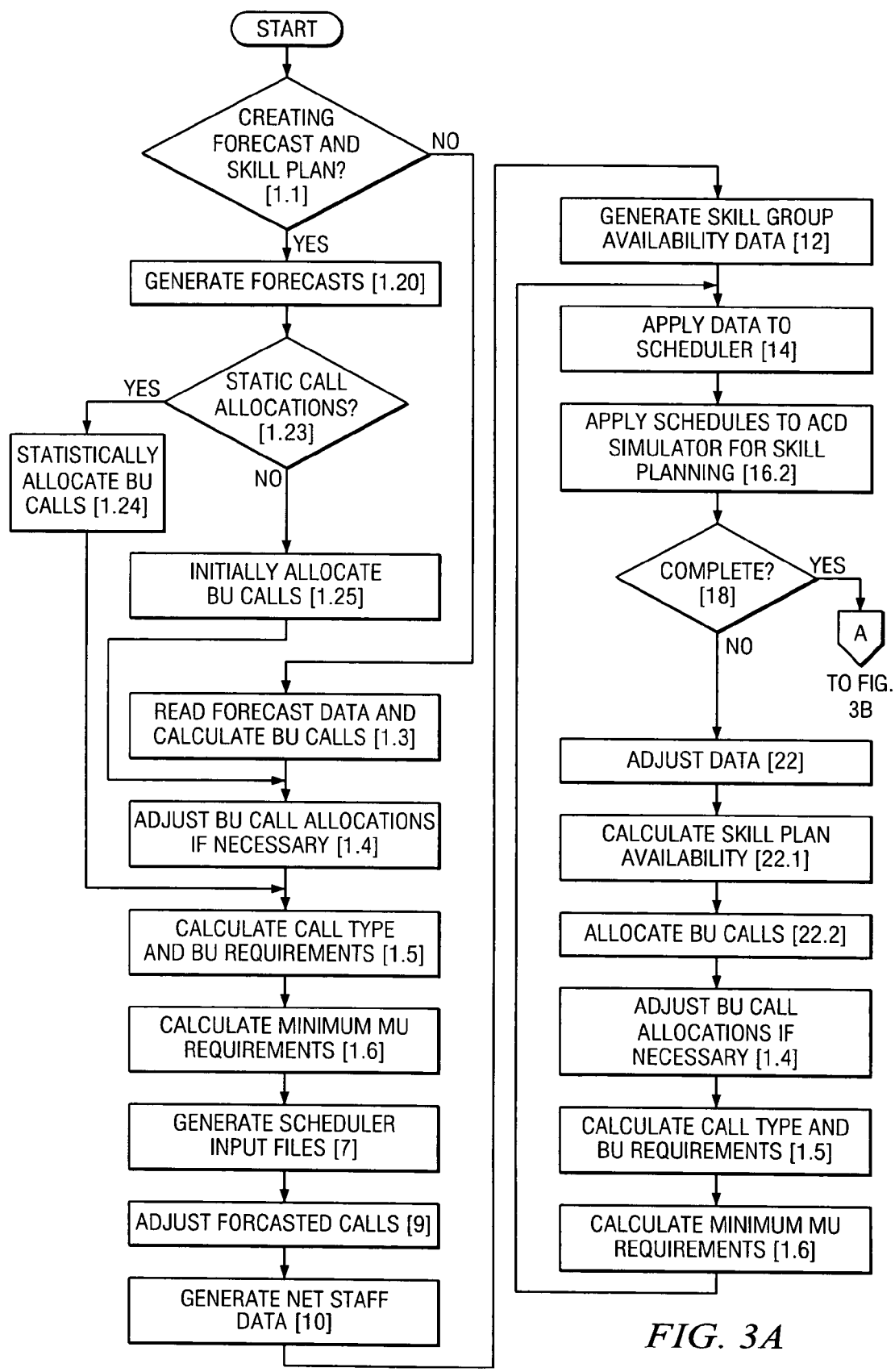
FIGS. 3A–3B are a detailed flowchart illustrating the preferred processing for creating skill forecasts and the skill plan as well as regenerating the skill plan according to the present invention.
Figure 3B:
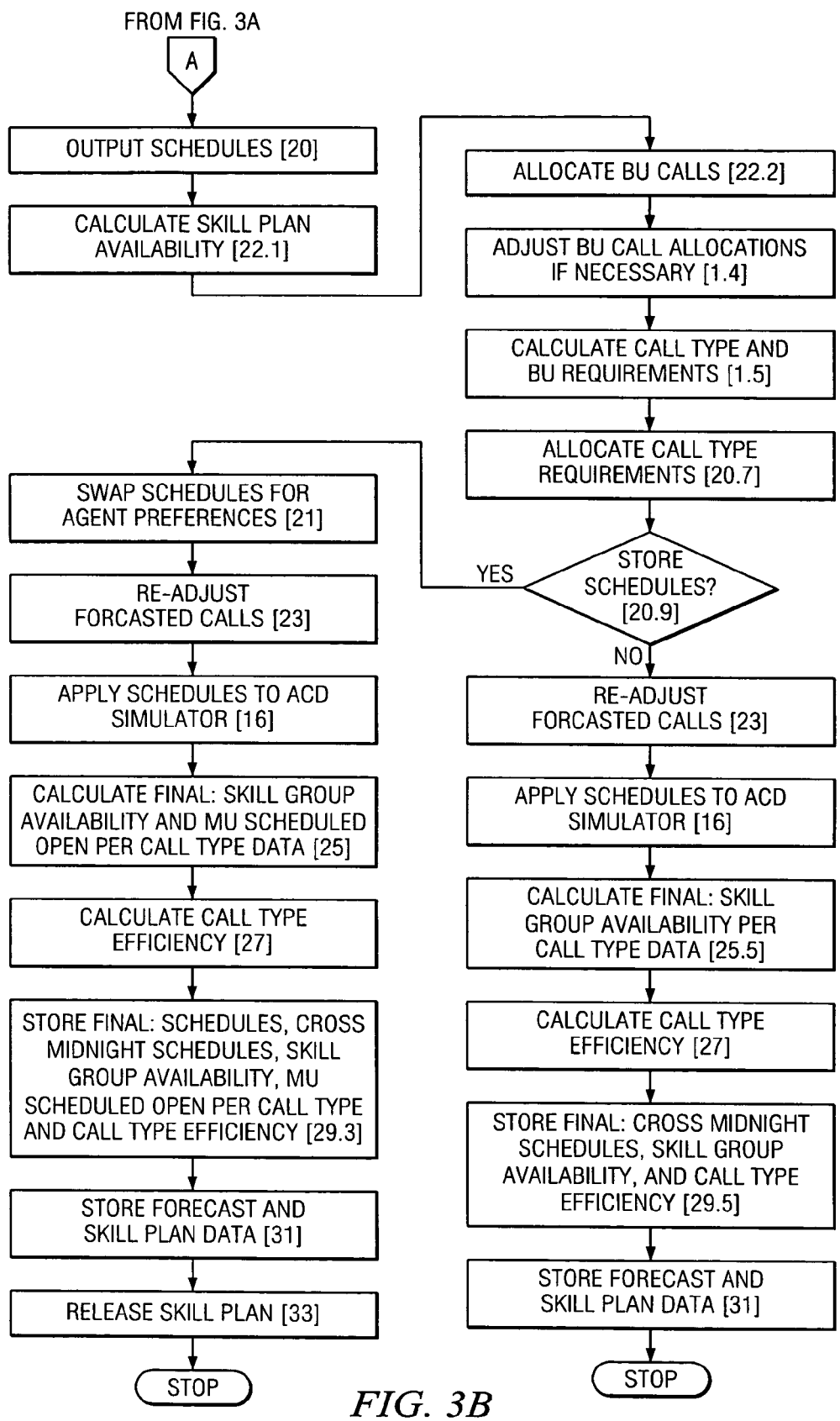

FIGS. 3A–3B are a composite flowchart illustrating the preferred processing for creating skill forecasts and the skill plan as well as regenerating the skill plan according to the present invention. The references numerals in the various steps are described in similarly-numbered sections in the following description. The steps that are not defined in this section are defined in the following section for skill scheduling.

1.1.1 Creating Forecast and Skill Plan—Step 1.1
This step determines if the user has requested to create a skill forecast or a skill plan. If the user has requested to create a skill forecast, then the next step will be step 1.20; otherwise, the next step will be step 1.3.

1.1.2 Generate Forecasts—Step 1.20
This step generates the following forecasts:
Forecast call volume for each BU in the SAGrp
Forecast call volume for each Call Type (in or not in a BU) in the SAGrp
Forecast AHT for each Call Type (in or not in a BU) in the SAGrp 1.1.3 Static Call Allocations—Step 1.23
This step checks to see if the user is using static call allocations for the BU. The BU will be considered to be using static call allocations if the static allocations option is set in an options field of the dbBUnit table.

1.1.4 Statically Allocate BU Calls—Step 1.24
If the previous step found that the user is using static call allocations, then the BU forecasted calls are allocated to each Call Type in the BU based on user-defined percentage from the minimum call allocations.

Note that the user may erroneously define static allocations that sum to less than or more than 100%. In these cases, the static allocations of calls will be normalized so that the forecasted BU call volume is not changed and so that the allocation of calls will be based on the ratio of the percent allocations to the total percent as described below.

If the sum of the percentages used to allocate calls for a period sum to more or less than 100%, then the calls will be allocated to each call type based on the formula below.

$$CTCallAllocation = BUForecastedCalls \times \frac{CTStaticPercentAllocation}{\sum_{ForAllCTsInBU} CTStaticPercentAllocation}$$

Calculation to Normalize Erroneous Static Call Allocations 1.1.5 Initially Allocate BU Calls—Step 1.25
The BU forecasted calls are allocated to each Call Type in the BU based on a percentage calculated from the ratio of the call volume forecast for each Call Type to the sum of calls forecasted for all call types.

1.1.6 Read Forecast Data and Calculate BU Calls—Step 1.3
If this step is being executed, the user is regenerating the Skill Plan and forecast data already exists. Therefore, this process reads the revised forecast call volume and AHT for each Call Type (in or not in a BU) in the SAGrp.
The BU call volume is calculated for each BU in the SAGrp by summing the revised forecast call volume from each Call Type assigned to the BU.

1.1.7 Adjust BU Call Allocations if Necessary—Step 1.4
If the allocated percentage of calls to each call type is less than the minimum call allocation for any period, then the BU call allocations are adjusted as follows:
If a call type in the BU was allocated a smaller percentage of BU calls than its minimum call allocation, then reallocate the calls in the BU by first giving each call type its minimum allocation of calls, then by allocating the remaining calls to the call types that do not have minimum allocations based on the ratio of the original number of calls allocated to each call type without minimum call allocations and the total number of calls for call types without minimum call allocations.

1.1.8 Calculate Call Type and BU Requirements—Step 1.5
This step calculates requirements for each Call Type (in or not in a BU) in the Skill Allocation Group. After the call type requirements are calculated, the BU requirements are calculated for each BU in the Skill Allocation Group. The BU and call type requirements are updated for each BU that has BU Efficiency enabled.
This function appears three times in the flowchart. In the flow, the first time this function occurs, the initial Skill Plan requirements are calculated. The second time this function occurs is in the feedback loop where the Skill Plan requirements are being adjusted during each iteration of the feedback loop. The third and final time this function occurs is for calculating the final Skill Plan BU and Call Type requirements after the final skill plan availability has been calculated.

1.1.9 Calculate Minimum MU Requirements—Step 1.6
The minimum MU requirements are calculated by multiplying the minimum MU requirements allocation percentage per call type by the call type requirements calculated in the previous step.

1.1.9a Apply Schedules to ACD Simulator for Skill Planning without Network Routing—Step 16.2
This step will work as Section 1.2.1.6, "Apply Schedules to ACD Simulator—Step 16" (below), except that the simulator will not simulate the network routing of BUs, since the allocation of calls has already been planned and this simulation is to update the Skill Group Availability, MU Scheduled Opens and Multi-Skill Efficiency data based on the allocation of calls.

1.1.10 Apply Schedules to ACD Simulator for Skill Planning—Step 16.1
This step is described in Section 1.2.1.6 (below), "Apply Schedules to ACD Simulator, except that the simulator will consider agents who are scheduled for "Open time", or any Skill Plan Availability code to be logged in and available to handle a call and will consider agents who are scheduled for any other code to be off the phone.

1.1.11 Calculate Skill Plan Availability—Step 22.1
Skill Plan Availability is calculated per call type for each period in the week. Agents are included in the skill plan availability calculations per call type for each call type that the agent handled when scheduled for "open time" or scheduled for an exception that is configured as available for the Skill Plan (i.e. Skill Plan Availability codes).

The Skill Plan Availability per Call Type per period is calculated for each agent as shown in the formula below.

NumSkAvlMins: the total number of minutes the agent scheduled for "open time" or an exception that is configured as available for the Skill Plan during the associated period SkGrpAvlPctCT: the skill group availability percent for the agent's skill group and the associated call type NumMinsInPer: either 15 or 30 depending on the statistic period length set for this customer $$SkillPlanAvailabilityPerCTPerAgent = \frac{NumSkAvlMins \times SkGrpAvlPctCT}{NumMinsInPer}$$

The Skill Plan Availability per Call Type per period for all agents is calculated by summing all skill plan availability per call type per agent for the associated period as shown below.

$$SkillPlanAvailabilityPerCT = \sum_{ForThisPeriod} SkillPlanAvailabilityPerCTPerAgent$$

Skill Plan Availability Calculation Per Call Type 1.1.12 Allocate BU Calls—Step 22.2

For periods where the BU minimum call allocations equal 100%, the minimum allocations are used to allocate BU calls to the associated call types. For all other periods, the skill plan availability for each call type in the BU is used for the allocation of the BU calls to each call type in the BU.

1.1.13 Allocate Call Type Requirements—Step 20.7

For periods where the minimum requirement allocations do not sum to 100%, the MU requirements per call type are calculated by allocating the call type requirements to each MU based on the percentage calculated from the ratio of the MU's skill plan availability for the call type over the sum of all of the skill plan availability for this call type from all MUs that handle this call type.

If the allocated percentage of requirements from the call type to each MU is less than the minimum requirement allocation for any period, then the call type requirement allocations are adjusted as follows:

If any MU that serves the call type was allocated a smaller percentage of call type requirements than its minimum requirement allocation, then reallocate the requirements for the call type by first giving each MU its minimum allocation of requirements, then by allocating the remaining requirements to the MUs that do not have minimum requirements. This allocation is based on the ratio of the each MU's skill plan availability for the call type over the sum of all of the skill plan availability for this call type from all MUs that handle this call type.

1.1.14 Store Schedules—Step 20.9

This step determines if the user has requested to store schedules.

1.1.15 Calculate Final: Skill Group Availability per Call Type Data—Step 25.5

This step calculates the skill group availability per call type as described in Section 1.2.1.12, "Calculate Final: Skill Group Availability and MU Scheduled Open per Call Type Data" without calculating the MU scheduled open per call type.

1.1.16 Store Final: Schedules, Cross Midnight Schedules, Skill Group Availability and Call Type Efficiency—Step 29.3

This step stores the final schedules, skill group availability and call type efficiency as described in Section 1.2.1.14, "Store Final: Schedules, Skill Group Availability, MU Scheduled Open per Call Type and Call Type Efficiency—Step 29" and in addition stores the cross midnight schedules as described below.

Schedules that cross midnight from the last day of the week being planned into the first day of the next week must be stored in a cross midnight schedules database (dbXMidScheds). This is needed for the skill plan generation for the next week to be able to accurately simulate the first day of the week by understanding the additional agents and availability derived from these cross midnight schedules. These cross midnight schedules must be stored in a separate database from the schedules, since skill plan availability is calculated before agent preferences are granted since granting agent preferences across skill groups can negatively impact the planned coverage.

When creating the skill plan, the schedules that cross midnight into the first day of the next week are stored in the new xmidscheds files for use when planning the next week. In addition, the final skill group availability, and call type efficiency will be stored in the database. For each skill group that has skill group availability data stored, the lastUsed field in dbSkillGrpMap will be updated if necessary.

If the user selected to "store schedules", then the entire set of schedules (including another copy of the cross midnight schedules that are stored in the new xmidscheds files for cross midnight availability) and MU scheduled open per call type are stored in the database. In addition, if this is not being generated as part of a skill forecast (i.e. the user selected Generate Skill Plan to regenerate the plan) and the user selected to "store schedules," then this process will also store the final skill group availability and call type efficiency.

1.1.17 Store Final: Cross Midnight Schedules, Skill Group Availability and Call Type Efficiency—Step 29.5

This step stores the final cross midnight schedules, skill group availability and call type efficiency as described in Section 1.1.16, "Store Final: Schedules, Cross Midnight Schedules, Skill Group Availability and Call Type Efficiency—Step 29.31" without storing any schedules or MU scheduled open per call type.

1.1.18 Store Forecast and Skill Plan Data—Step 31

When generating a Skill Forecast, this step stores the original and revised forecast data for each call type in the Skill Allocation Group. When re-generating the Skill Plan, this step stores the revised forecast data for each call type in the Skill Allocation Group, but will not change the original forecast data.

When generating a Skill Forecast or re-generating a Skill Plan, the Skill Plan data will be stored. Because the entities in the Skill Allocation Group may have changed, this step ensures that Skill Plan data for entities that are no longer in the Skill Allocation Group is removed for the associated date and time periods.

1.1.19 Release Skill Plan—Step 33

In this step, the Skill Plan is released because the user selected to store schedules.

1.2 Skill Set Schedule Generator

The schedule generation process handles calculating the availability of agents associated with a Skill Allocation Group when creating or updating the Skill Plan data when the Skill Forecast or Skill Plan is generated or regenerated. In addition, the schedule generation process handles creating schedules for each MU in a Skill Scheduling Group in order to meet the Skill Plan. Because the algorithm for creating schedules to determine skill plan availability and the algorithm for creating skill schedules is similar, they are both specified in this section with the differences between creating the skill plan and creating the skill schedules noted.

Skill Planning

The system will create schedules for each multi-skilled agent, taking into consideration the minimum call allocations for each call type, the minimum call type requirement allocations for each MU, the total requirements for each call type, the network routing rules (if applicable), the time to abandon per call type, ACD parameters, ACD call routing rules, agent skills, agent skill levels, reserved skills, and forecasted calls and AHT per call type in addition to the other agent work rules and preferences.

The scheduler reads the time zone setting from the skill allocation group when creating the skill plan.

Skill Scheduling

The system will schedule each multi-skilled agent, taking into consideration the MU Skill Plan requirements for each call type, the ACD call routing rules, the time to abandon per call type, ACD parameters, agent skills, agent skill levels, reserved skills, and forecasted calls and AHT per call type in addition to the other agent work rules and preferences.

The scheduler reads the time zone setting from the skill allocation group to which the skill scheduling group belongs when creating skill schedules to determine which periods to schedule.

Figure 4:
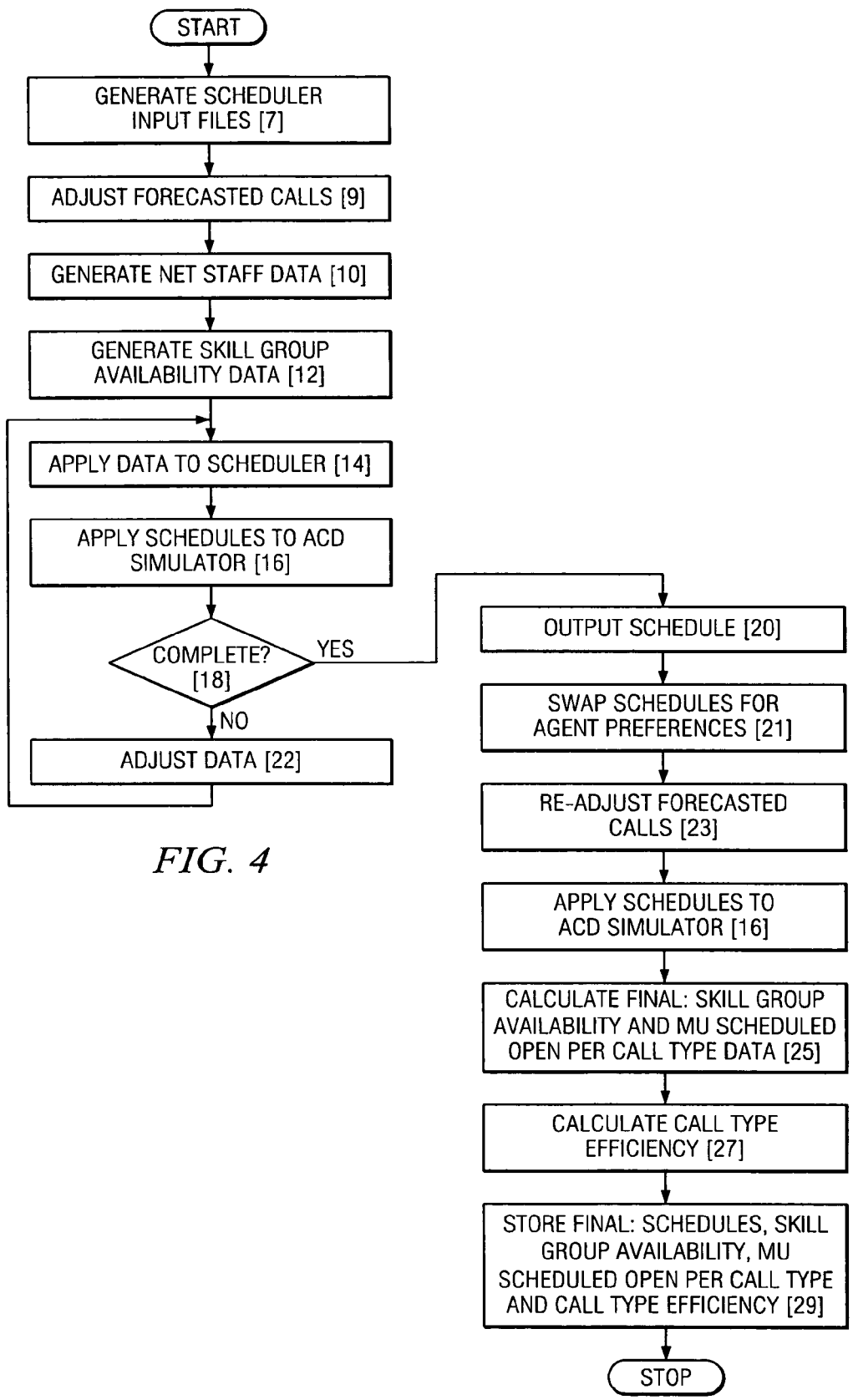
FIG. 4 is a flowchart illustrating a method for skill scheduling.

FIG. 4 is a detailed flowchart illustrating a method by which a series of call handling simulations are run to generate interim schedules that, through a feedback mechanism, progress toward some optimum scheduling solution. The individual steps are identified below.

1.2.1.1 Generate Scheduler Input Files—Step 7

1.2.1.1.1 Skill Planning and Skill Scheduling

In this step the input files for the scheduler are created for the scheduler to use to generate either the Skill Plan (including the schedules used to calculate skill plan availability) or the Skill Schedules. For skill planning, another ASCII input file is created with the schedules (with the associated agents, and limited position assignments) that cross midnight from the last day of the previous week into the first day of the week being planned.

1.2.1.2 Adjust Forecasted Calls—Step 9

1.2.1.2.1 Skill Planning

The schedules that are created for the skill plan must include the staffing adjustments necessary to account for schedule overhead and call type maximum occupancy. Therefore, the BU forecasted calls and non-BU call type forecasted calls are increased to account for the associated call type schedule overhead and call type maximum occupancy when planning.

Therefore, when planning, the call type forecasted call volume that is simulated for non-BU call types is adjusted as defined in the next section (see Section 1.2.1.2.2, "Skill Scheduling"). For BUs, the adjusted forecasted call volume for each call type in the BU are summed and used in simulating the BU call volume when creating the Skill Plan.

1.2.1.2.2 Skill Scheduling

The issues of the user changing the call type requirements and adding schedule overhead per call type after adjustments for maximum occupancy are handled by having a call type extractor increase or decrease the call type's forecasted calls per period as defined in the following algorithm.

Given: Forecasted Calls (1000), Forecasted AHT (300), Occupancy Adjustment Factor (100), Forecast Interval (30 minutes), Service Level Goal (80% within 20 seconds), Maximum Occupancy Goal (85%), Revised (i.e. user edited, in this case since BErlangC requirements would be 175:92) Skill Plan Requirements without Maximum Occupancy (200.00), Schedule Overhead: 10%.

Derive the Forecasted Calls that result in a BErlangC output equal to or the first value greater than the Revised Skill Plan Requirements without Maximum Occupancy (Forecasted Calls: 1143).

Calculate Revised Skill Plan Requirements with Maximum Occupancy (224.12).

Apply Schedule Overhead to the Revised Skill Plan Requirements with Maximum Occupancy (246.53).

Calculate the Revised Skill Plan requirements that include the schedule overhead added after maximum occupancy, without including the additional requirements for maximum occupancy. This will be calculated by starting with the Revised Skill Plan requirements without Maximum Occupancy (200.00) and adding the Skill Plan requirements with maximum occupancy and schedule overhead applied (246.53) and then subtracting the Skill Plan requirements with maximum occupancy without schedule overhead applied (224.12); (Result: 222.41).

Derive the Forecasted Calls that result in a BErlangC output equal to or the first value greater than the Revised Skill Plan Requirements calculated in the previous step (Forecasted Calls: 1275).

The Forecasted Calls derived in the previous step are the Adjusted Forecasted Calls.

1.2.1.3 Generate Net Staff Data—Step 10

1.2.1.3.1 General

In step 10, one or more "net staff" arrays are generated.

The initial estimates for net staff values need not be extremely accurate, as they are refined in later iterations of the method as will be described. In particular, the net staff arrays provide, for each time interval to be scheduled, the number of agents (usually a fractional amount) over (if positive) or under (if negative) the total needed to cover all of or a portion of agent requirements for that interval. As scheduling proceeds, the net staff for a given interval may be fractional, it may be negative if the interval is understaffed or positive if the interval is already over-staffed. Thus, the net staff array contains values representing the difference between a currently-scheduled staff and an amount of staff needed to handle the requirements during the interval, in other words, a current estimate of the difference between the staffing level provided in the current schedule and the staffing level needed to meet current requirements.

1.2.1.3.2 Skill Planning

When creating the skill plan, the scheduler needs two net staff arrays. One array contains the net staff associated with the call type requirements. The call type requirements net staff array is generally a one-dimensional array (for each call type) that contains "difference" values generated (at least initially) using call volume forecasts and Erlang processing, all in a known manner. That is, the initial net staff generated in this step is the negative of the forecasted requirements for each call type that has been adjusted for BU efficiency (if applicable) and maximum occupancy and has had schedule overhead applied for each schedule interval in the week being scheduled. The other contains the net staff associated with the minimum MU requirements. In this step, these minimum MU net staff values will be calculated as shown in Section 1.2.1.9.2, "Skill Plan Processing".

1.2.1.3.3 Skill Scheduling

When creating the skill schedules, the scheduler needs a net staff array for each call type and MU. These values are calculated in this step.

1.2.1.4 Generate Skill Group Availability Data—Step 12

1.2.1.4.1 Skill Planning and Skill Scheduling

The method then continues with a skill group availability array for each call type being generated and stored in a new Skill Group Availability file. The skill group availability array has two dimensions, namely, skill group (a group of agents within an ACD who have the same skills, reserved skills and skill levels) and time interval for each time interval in the week being scheduled. For each combination of skill group and time interval, the array provides a "current estimate" for the fraction of availability the call type should expect for scheduled agents. The initial estimates for values in this array need not be extremely accurate, as they are refined in later iterations of the method as will be described. The initial estimate used will be calculated by giving each call type that may be handled by a skill group an equal percentage based on the number of call types that the skill group can handle. Note that this will be determined by the call distribution rules for each call type in the skill allocation group (for skill planning) or in the skill scheduling group (for skill scheduling). For example, if a skill group can handle 4 call types, then initially each call type will be estimated to be used 25% of the time.

Agents that are assigned reserved skills will not be considered to provide any availability for their reserved skills in this initial step. Agents that are assigned skills that are limited by the positions for the associated MU, will not be considered to have those skills (i.e. will be considered to be in a skill group that does not have those skills) until assigned to a limited position by the scheduler.

1.2.1.5 Apply Data to Scheduler—Step 14

1.2.1.5.1 General

The schedule output from the scheduler describes all staffing for one week. For every agent that will be assigned to work during the week, there is a schedule entry for every day the agent will work. The schedule entry indicates what time the agent will start work, when each break or lunch is scheduled, any future exceptions that have been scheduled and when the agent will finish work. The schedule may exist in several forms, although the form used as input by the simulator portion (in the next step) will be a simple ASCII text file.

An agent's skill group may change day to day due to moving agents to a different ACD, skills defined by date and assignments to limited positions. By definition, the skills assigned per date apply to the agent's entire schedule that begins on that date, even if the schedule crosses midnight.

1.2.1.5.2 Skill Planning

This section describes how the scheduler is used to create schedules to calculate the skill plan availability.

1.2.1.5.2.1 Schedule for Minimum MU Requirements First

The method then continues to apply the current net staff array(s), minimum MU net staff array(s) and skill group availability array(s) (one for each call type, respectively) to a scheduler. This program takes the net staff array(s), minimum MU net staff array(s) and the skill group availability array(s) input thereto, processes that data, and generates a first iteration of a schedule if this is the first pass through the loop; otherwise the current schedules are updated to provide better coverage for each call type based on the updated net staff array(s), minimum MU net staff array(s) and the skill group availability array(s). The scheduler creates/updates schedules to provide better coverage by first attempting to cover the period with the greatest need (as defined by the coverage factor setting) for the minimum MU net staff across all call types.

After the minimum MU net staff array(s) have been met, then schedules are created/updated to provide better coverage for the outstanding call type requirements with agents from any MU that contains agents with the skills necessary to handle the call type and who are assigned to the associated ACD.

In some cases, all agents in an MU could be scheduled without meeting the minimum MU requirements for a particular call type.

The scheduler determines when either the minimum MU requirements for all MUs have either been met or cannot be met. After determining that the minimum MU requirements are met or cannot be met, then the scheduler attempts to create/update schedules to meet the call type requirements for all periods being scheduled.

1.2.1.5.3 Skill Scheduling

The method then continues at step 14 to apply the current net staff array(s) per MU and skill group availability array(s) (one for each call type, respectively) to a scheduler. This program takes the net staff array(s) and the skill group availability array(s) input thereto, processes that data, and generates a first iteration of a schedule if this is the first pass through the loop; otherwise the current schedules are updated to provide better coverage for each call type based on the updated net staff array(s) and the skill group availability array(s). The scheduler will update schedules to provide better coverage by attempting to cover the period with the greatest need (as defined by the coverage factor setting) across all call types.

1.2.1.6 Apply Schedules to ACD Simulator—Step 16

1.2.1.6.1 Skill Planning and Skill Scheduling

This section describes how the ACD simulator simulates the schedules. The simulator works slightly different when creating the skill plan versus creating skill schedules. These differences will be noted individually below.

The method continues at step 16 by applying the schedules to an ACD simulator module to run a call handling simulation. The simulator generally performs the following actions:

1. Reads a set of weekly schedules and creates simulated agents who will log in, log out, and go on breaks at the times indicated in the schedule (the simulator, of course, runs many times faster than real-time, so a particular simulation of a week's call center activity takes seconds or minutes depending on the size of the call center). The simulator will consider agents who are scheduled for a particular exception code to be logged in and available to handle a call if the exception code is an "open" code or is the "Open time" code and will consider agents who are scheduled for any "closed" code to be off of the phone.

2. Generates simulated calls that match the adjusted forecasted call volumes for the call types in the skill allocation group (when creating the skill plan) or in the skill scheduling group (when creating skill schedules). Calls are simulated to arrive in the call center using an exponential distribution for inter-arrival time.

3. When creating the skill plan, the simulator delivers the simulated calls in the network (i.e. BU level) to the associated call types using decision logic similar to what would be used by an actual network call router, unless the BU is using static allocations. When creating skill schedules, the network routing is not simulated since the number of BU calls that are to be handled by each call type have already been planned. Therefore, when creating skill schedules, the BU calls that were allocated to each call type are simulated to randomly arrive at that call type.

4. Delivers the simulated calls to the simulated agents using decision logic similar to what would be used by an actual ACD, and simulates the agents' handling of the calls using average handle time statistics provided from the forecasted AHT for the associated call type.

5. Collects and reports statistics about the simulated call center including, for example, the service level for each call type, the number of simulated calls abandoned by the caller for each call type. The service level of a call type is calculated based on the time each call was received by ANY ACD and the time until the call was answered by an agent on ANY ACD. That is, the total amount of time the caller was simulated to wait is held against the call type that answered the call.

6. Estimates the number of additional agents needed (or the number of surplus) for each call type at each simulated schedule interval (a "schedule interval" is, for example, "5" or "15" minutes) so that the simulated service level and the simulated agent occupancy would meet the customer's targets.

7. Keeps track of how much simulated time each simulated agent spent on each call type, and how much time each agent was available. Thus, the call handling simulation in step 16 decides what to do when each simulated call arrives, and when each simulated agent becomes free to handle another call.

8. The specific call handling simulation may be suitably controlled by a call distribution algorithm that may vary depending on the type of ACD being simulated and/or whether or not the ACD supports multiple skills-based priority levels.

The simulator runs through a number of simulation passes to average the results. The number of passes of simulation is entered by the user.

The simulator is seeded with a well known value to allow the simulation to be recreated if necessary. (For example, the beginning date of the week being simulated could be used as the seed.)

To incorporate the effects of calls in queue at the end of one period affecting the next period, because one or more previous periods were not sufficiently staffed, the simulator simulates the entire week being scheduled in a single run. That is, the simulator will not simulate each day independently (i.e. clear out all calls in queue at midnight and restart the simulation at midnight the next day).

Agents are not included in the simulation if they have no skills defined for the associated date. In the case where a schedule exists for an agent with no skills defined for the associated date, then a warning message is included in the process report.

An agent's skill group may change day to day due to moving agents to a different ACD, skills defined by date and assignments to limited positions. By definition, the skills assigned per date apply to the agent's entire schedule that begins on that date, even if the schedule crosses midnight.

Call distribution rules (i.e. vectors) can be defined for each BU and call type. The simulator validates these rules and provide specific, detailed error messages to the user in the process report for any invalid rules. The BU rules are only validated when creating the skill plan.

1.2.1.7 Complete—Step 18

1.2.1.7.1 Skill Planning and Skill Scheduling

Once the schedule is processed in this way, a simulation "pass" is complete. A test is then done at step 18 to determine whether the process is "complete." If the outcome of the test is positive, the method branches to step 20 and outputs a schedule. If, however, the outcome of the test at step 18 is negative, the method "adjusts" the net staffing and skill group availability arrays at step 22 (as will be described below). When generating the Skill Plan, steps 22.1, 22.2, 1.4, 1.5 and 1.6 are processed next. For either Skill Planning or Skill Scheduling, the process then returns to step 14 to revise the current weekly set of schedules, which is then applied to the simulator in a next "pass" or iteration. The outcome of the test at step 18 will depend on multiple factors used to determine when to stop the process.

This method involves successively iterating and refining schedules multiple times.

The system determines the stopping point of the process using parameters entered by the user indicating the maximum number of schedule/simulation runs the process may make, the maximum length of time that the process may take, and whether the process may stop if the service level and maximum occupancy goals are met and the overstaffing per period does not exceed the user entered amount.

The process is interrupted if the entered maximum time has elapsed since the process began executing. If the maximum time has elapsed without the process completing one schedule/simulation pass, then the process will stop and no schedules will be stored. If at least one schedule/simulation pass has completed and the maximum time limit is exceeded on the next pass, the schedules from the previous iteration will be used to calculate the final data which will be stored before the process completes. Therefore, the process may run a little longer than the maximum time in order to finish.

If the maximum time has not elapsed, then the other stopping parameters will be checked after each schedule/simulation pass. If the number of schedule/simulation passes has been completed, then the process calculates and stores the final data. If the service level and maximum occupancy goals have been met and the overstaffing per period does not exceed the user entered amount, then the process calculates and stores the final data. If these stopping parameters were not met, then another schedule/simulation pass is done.

1.2.1.8 Output Schedules—Step 20

1.2.1.8.1 Skill Planning and Skill Scheduling

In this step, the current set of schedules are written to an ASCII file of schedules to be used in subsequent steps of this process.

1.2.1.9 Adjust Data—Step 22

1.2.1.9.1 General

If the outcome of the test at step 18 is negative, however, a new "pass" or iteration is run. Information generated during a previous simulation (and output by the simulator) is then used to adjust the net staffing and skill group availability array(s) for the next scheduler pass. This "feedback" technique is designed to drive the method toward an "optimum" schedule, which typically occurs after a plurality of iterations.

The information used to adjust the arrays is as follows. As noted above, the simulator estimates the number of additional agents needed (or the number of surplus) for each call type at each simulated schedule interval so that the simulated service level would meet the customer's target for that interval and so that the maximum occupancy goals would be met. This information is substituted in the "net staffing" arrays used for the next scheduler run. Likewise, as noted above, the simulator keeps track of how much simulated time each simulated agent spent on each call type, and how much time each agent was available. This information is used to create the skill group availability data that comprises the skill group availability array for the next scheduler pass. Thus, the step of adjusting the arrays preferably involves creating new array(s) in which the new net staffing and skill group availability data is substituted for the data in the prior pass.

More specifically, the net staff and skill group availability arrays are refined as follows. For every simulated 5-minute or 15-minute (based on the schedule period) interval, the simulator keeps track of how many calls of each type arrived, and how many were answered. It also keeps track of how much simulated available and talk time each skill group had per schedule interval.

The simulator simulates a number of calls to be delivered for each statistic period based on the associated requirements. However, simulation statistics are kept for each schedule period in order to calculate net staff and skill group availability per schedule period.

The simulator simulates the associated number of calls received for each statistic period (15 or 30 minutes). However, since the user may schedule start times, breaks and lunches on 5 or 15 minute periods (schedule periods), the simulator calculates skill group availability and skill group data for each schedule period. Because of this mismatch in time periods between agent coverage (skill group availability) per call type and the adjusted requirements, the adjusted requirements are calculated for each schedule period and the largest value is used for the entire statistic period.

1.2.1.9.2 Skill Plan Processing

When creating the skill plan, the scheduler needs two net staff arrays. One array contains the net staff associated with the call type requirements. The other contains the net staff associated with the minimum MU requirements. These net staff arrays are calculated in this step.

1.2.1.9.3 Skill Scheduling Processing

When the scheduler/simulator is running for the skill scheduling process, the scheduler attempts to meet the skill plan requirement allocations per MU. To do this, the net staffing per call type and MU over or under the skill plan requirements per MU must be calculated and each potential schedule evaluated against this net line. This net staff array is calculated in this step.

1.2.1.10 Swap Schedules for Agent Preferences—Step 21

1.2.1.10.1 Skill Planning

This step is skipped when creating the forecast or skill plan unless the user has selected the "store schedules" option. This step is done after the agent availability has been calculated from the schedules since granting preferences across skill sets changes the associated coverage of each call type. If the "store schedules" option has been selected, the processing occurs as described in the following section for skill scheduling. A copy of the schedules that cross midnight into the next week is made to store schedules that have not been adjusted for agent preferences into the new cross midnight database table.

1.2.1.10.2 Skill Scheduling

In this step, the scheduler grants preferences by seniority by swapping schedules between agents. The schedules will only be swapped between agents in the same MU.

1.2.1.11 Re-adjust Forecasted Calls—Step 23

1.2.1.11.1 Skill Planning and Skill Scheduling

At this point in the processing the best schedules have been found for the requirements for each call type in the skill scheduling group. These schedules were generated to meet the service level goals for each call type based on the skill plan requirements, the maximum occupancy of each call type and to provide the necessary schedule overhead for each call type.

There is some more processing that must be done before this process can complete.

The system needs to calculate the number of agents that are scheduled to be available (scheduled open) per call type so that the user sees the associated understaffing and/or overstaffing per call type. For example, if the user has entered positive schedule overhead per call type and the scheduler was able to schedule enough agents to provide for the schedule overhead, then the system will show the resulting overstaffing. The system shows the understaffing and overstaffing per call type.

The system calculates the understaffing and overstaffing by running one more simulation using the schedules that were created; however, the forecasted calls that will be used in this simulation will be the forecasted calls that correspond to the skill plan requirements without maximum occupancy and without schedule overhead. This allows the system to calculate accurate skill group availability numbers and accurate MU scheduled open numbers. Therefore, this step will adjust the forecasted call volume so that the BErlangC call results in a requirement value that is equal to or the first value greater than (if the calls cannot be adjusted to provide the exact value) the skill plan requirement that has not been adjusted for maximum occupancy and has not been adjusted for schedule overhead. This call volume is used in the final simulation to accurately calculate (i.e. not skewed by the call volume that was used in the initial passes that includes adjustments for schedule overhead) the final set of data to be stored in the database.

1.2.1.12 Calculate Final: Skill Group Availability and MU Scheduled Open per Call Type Data—Step 25

1.2.1.12.1 Skill Planning and Skill Scheduling

This step calculates the final skill group availability data just as the skill group availability data is adjusted in step 22.

In addition, this step calculates the MU scheduled open data per call type. This MU scheduled open per call type is calculated as defined in the formula below.

$$MUSchedOpenPerCallType = \frac{\sum_{ForallSchedPeriodsInStatPeriod} TotalStaffPerCallType \& MU}{NumSchedPeriodsPerStatPeriod}$$

MU Scheduled Open Per Call Type Formula

1.2.1.13 Calculate Call Type Efficiency—Step 27

1.2.1.13.1 Skill Planning and Skill Scheduling

In certain cases, there is a need to calculate a call type efficiency value per statistic period that will be applied to the requirements in order to lower the requirements that the call center attempts to provide agents to meet. The reason that call type efficiency values are needed is due to the fact that using multi-skilled agents allows the call center to handle the forecasted number of calls and AHT with fewer virtual agents than calculated by the ErlangC formula. Therefore, if after the final simulation (using forecasted calls that are not adjusted to include the maximum occupancy or schedule overhead) there are not as many virtual agents scheduled for a call type as calculated by the ErlangC formula, but the simulation results show the service level is met and the maximum occupancy is met for the call type, then the multi-skilled agents are more efficient than the requirement calculated using ErlangC and adjusting for maximum occupancy. Thus, the system needs to lower the skill plan requirements on various screens and reports in order for the user to know that enough agents have been scheduled to meet the need. Otherwise, the user would erroneously believe that not enough agents were scheduled to meet the requirements.

Call Type Efficiency is defined as the factor which applied to the skill plan requirements without maximum occupancy and without schedule overhead results in the accurate number of agents required to meet the service level and maximum occupancy goals based on the efficiency gained by the currently scheduled agents.

Note that it might be possible for skills-based call routing to cause the efficiency of the call center to be worse than predicted by ErlangC and adjusted by the maximum occupancy. In this case, the Call Type Efficiency calculated will be greater than 1.0000.

The call type efficiency values are applied to the skill plan requirements that have been calculated and include the maximum occupancy. This allows managing to the skill plan requirements to include the efficiencies of the current set of schedules.

Note that the call type efficiencies do not affect the number of forecasted calls that are simulated in either set of simulator passes.

1.2.1.14 Store Final: Schedules, Skill Group Availability, MU Scheduled Open per Call Type and Call Type Efficiency—Step 29

1.2.1.14.1 Skill Scheduling

In this step, the schedules, final skill group availability, MU scheduled open per call type and call type efficiency that the scheduler/simulator creates are stored in the database. For each skill group that has skill group availability data stored, the lastUsed field in dbSkillGrpMap will also be updated if necessary. One of ordinary skill in the art will appreciate that while it is preferred to incorporate the above-described functionality for skill planning across multiple business units, this is not a requirement of the present invention. A two level hierarchy including call (or contact or, more generally, task) types and management units may also be used. There is no requirement that the invention be implemented with the business unit construct.

It should be appreciated that the above-described method steps are preferably implemented in one or more computers. A representative computer is a personal computer or workstation platform that is Intel x86-, PowerPC®- or RISC®-based, and includes system memory supporting an operating system such as Windows '98, Windows® NT, IBM® OS/2®, IBM AIX®, Unix, Linux, or the like, as well as one or more application program(s), routines or processes that implement the inventive functionality.

Thus, each of the components of the skills-based scheduling method and system is preferably software, and thus one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what I claim as new and desire to secure by Letters Patent is set forth in the following claims:

1. A method of allocating and scheduling requirements for agents in a multiple location, skills-based contact center environment organized into a hierarchy of one or more aggregated contact types at a first level, multiple contact types at a second level, and two or more management units at a third level, comprising the steps of:
   (a) creating a set of contact allocations that define how forecasted contacts are allocated from each of the one or more aggregated contact types at the first level to the multiple contact types at the second level, with each contact type of the multiple contact types at the second level being defined by one or more queues all located at a geographically distinct location, there being at least two or more geographically distinct locations in the multiple location skills-based contact center environment, wherein the step of creating a set of contact allocations allocates the forecasted contacts using agent availability data per each of the contact types of a given aggregated contact type and each time interval to be allocated, and wherein agent availability data is predicted by schedule simulation of agents working their schedules and handling contacts in the skills-based contact center environment;
   (b) creating a set of agent requirement allocations that define how agent requirements are allocated from the multiple contact types to two or more management units, each management unit defining a collection of agents at least some of whom have multiple skills wherein the step of creating a set of agent requirement allocations allocates the forecasted agent requirements using agent availability data per each of the contact types of a given aggregated contact type and each time interval to be allocated, wherein the agent availability data is predicted by schedule simulation of agents working their schedules and handling contacts in the skills-based contact center environment;

(c) allocating forecasted contacts and forecasted agent requirements based on the created contact and agent requirement allocations;

(d) using the allocated forecasted agent requirements to generate a schedule for each of the plurality of scheduled agents; and (e) repeating steps (a)–(d) until an output of a set of contact allocations and a set of agent requirement allocations occurs;

wherein at least the schedule simulation and at least one of steps (c)–(e) are performed at least in part through one or more processing devices.

2. The method as described in claim 1 wherein the created contact allocations are at least minimum contact allocations, wherein the minimum contact allocations are defined by a user.

3. The method as described in claim 2 wherein the created agent requirement allocations are minimum agent requirement allocations.

4. The method as described in claim 1 wherein the created contact allocations are at most maximum contact allocations, wherein the maximum contact allocations are defined by a user.

5. The method as described in claim 4 wherein the created agent requirement allocations are maximum agent requirement allocations.

6. The method as described in claim 1 wherein the created contact allocations are from the minimum to the maximum contact allocations, wherein the minimum and maximum contact allocations are defined by a user.

7. The method as described in claim 6 wherein the created agent requirement allocations are minimum and maximum agent requirement allocations.

8. The method as described in claim 1 further including the step of generating agent schedules for the management units.

9. The method as described in claim 1 wherein a management unit is located at a given contact center location in the multiple location, skills-based contact center environment.

10. The method as described in claim 1 wherein the contact center environment is a telephone call center.

11. The method as described in claim 1 wherein the contact center environment is a contact center that handles a contact selected from the group consisting of: telephone calls, voice mails, emails, faxes, mail, web callback requests, web chats, web voice calls, web video calls and outbound calls.

12. A method of allocating and scheduling in a multi-location, skills-based call center environment, comprising the steps of organizing the call center environment into a hierarchy of one or more aggregated call types at a first level, multiple call types at a second level, and a set of two or more management units at a third level;

(a) having a user create a set of given call allocations that define how calls are allocated from each of the one or more aggregated call types at the first level to the multiple call types at the second level, with each call type of the multiple call types at the second level being defined by one or more queues all located at a geographically distinct location, there being at least two or more geographically distinct locations in the multiple location, skills-based call center environment;

(b) having the user create a set of given agent requirement allocations that define how agent requirements are allocated from the multiple call types to two or more management units, each management unit defining a collection of a eats at least some of whom have multiple skills;

(c) predicting agent availability by call type using a schedule simulation to generate agent availability data, wherein the simulation data corresponds to agents working their schedules and handling contacts in the multi-location, skills-based contact center environment;

(d) allocating forecasted calls and forecasted agent requirements based on the given call and requirement allocations and the agent availability data;

(e) using the allocated forecasted agent requirements to generate a schedule for each of the plurality of scheduled agents; and (f) repeating the steps (a)–(e) until an output of a set of call allocations and a set of requirement allocations occurs;

wherein at least the schedule simulation and at least one of steps (c)–(e) are performed at least in part using one or more processing devices.

13. The method as described in claim 12 wherein the given call allocations and the given agent requirement allocations are minimum values.

14. The method as described in claim 12 wherein the given call allocations and the given agent requirement allocations are maximum values.

15. The method as described in claim 12 wherein the given call allocations and the given agent requirement allocations are minimum and maximum values.

16. An allocation method operative in a multi-location, skills-based contact center environment, comprising:

(a) organizing the contact center environment into a hierarchy of one or more aggregated contact types at a first level, multiple contact types at a second level, and a set of two or more management units at a third level;

(b) allocating a percentage of incoming contacts from each of the one or more aggregated contact types, at the first level to the multiple contact types at the second level, with each contact type of the multiple contact types at the second level being defined by one or more queues all located at a geographically distinct location, there being at least two or more geographically distinct locations in the multiple location, skills-based contact center environment;

(c) allocating agent requirements for a given contact type to one or more management units by predicting agent availability data using a schedule simulation of agents working their schedules and handling contacts in the multi-location, skills-based contact center environment, each management unit defining a collection of agents at least some of whom have multiple skills;

(d) using the allocated forecasted agent requirements to generate a schedule for each of the plurality of scheduled agents; and (e) repeating steps (b)–(d) until an output of a set of contact allocations and a set of requirement allocations occurs;

wherein at least the schedule simulation and at least one of steps (c)–(d) are performed at least in part using one or more processing devices.

17. The method as described in claim 16 wherein a given contact type is associated with a given automatic call distributor (ACD).

18. An allocation method operative in a multi-location, skills-based contact center environment, comprising
- (a) organizing the contact center environment into a hierarchy of one or more aggregated contact types at a first level, multiple contact types at a second level, and a set of two or more management units at a third level,
- (b) allocating a percentage of contacts from each of the one or more aggregated contact types at the first level to the multiple contact types at the second level, with each contact type of the multiple contact types at the second level being defined by one or more queues all located at a geo graphically distinct location, there being at least two or more geographically distinct locations in the multiple location skills-based contact center environment;
- (c) allocating agent requirements for the multiple contact types to two or more management units by predicting agent availability data using a schedule simulation of agents working their schedules and handling contacts in the multi-location skills-based contact center environment;
- (d) using the allocated forecasted agent requirements to generate a schedule for each of the plurality of scheduled agents;
- (e) repeating steps (b)–(d) until an output of a set of contact allocations and a set of requirement allocations occurs;

wherein at least the schedule simulation and at least one of steps (c)–(d) are performed at least in part using one or more processing devices.

19. The method as described in claim 18 wherein a given management unit is a collection of agents at least some of which are multi-skilled.

20. The method as described in claim 18 wherein a given contact type is associated with a contact distributor.

* * * * *